D. A. FREEMAN.
Land-Marker.
No. 68,297. Patented Aug. 27, 1867.
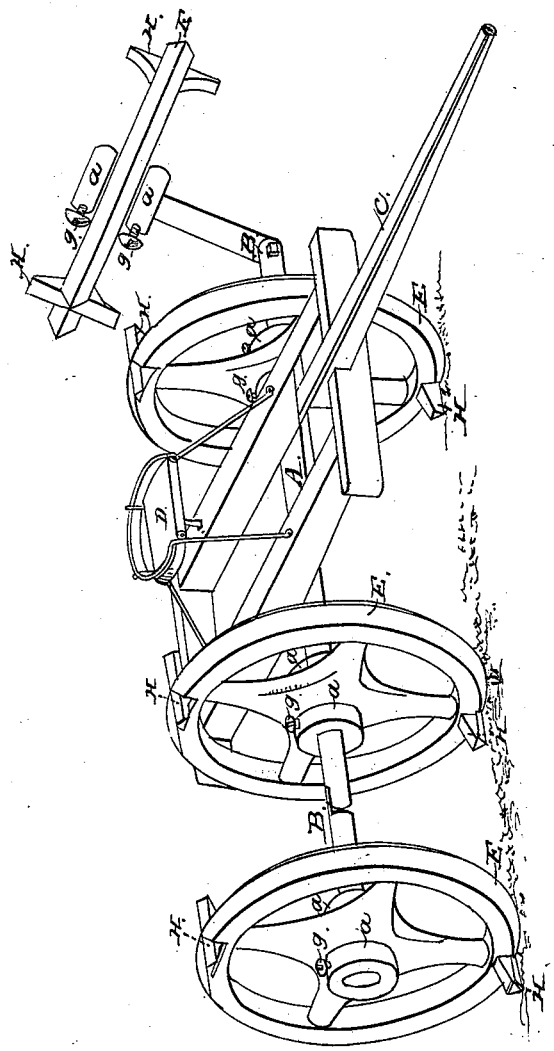

United States Patent Office.

DAVID A. FREEMAN, OF BELLEVILLE, MICHIGAN.

Letters Patent No. 68,297, dated August 27, 1867.

IMPROVEMENT IN CORN-MARKERS FOR PLANTING.

*The Schedule referred to in these Letters Patent and making part of the same.*

TO WHOM IT MAY CONCERN:

Be it known that I, DAVID A. FREEMAN, of Belleville, in the county of Wayne, in the State of Michigan, have invented a new and useful Improvement in Corn-Markers; and I do declare that the following is an accurate description thereof, reference being had to the accompanying drawings, and to the letters of reference marked thereon, and being a part of this specification.

In building my machine I use an axle, A, with joints B B. Upon this axle, A, I place a proper frame, C, with a driver's seat, D. To the axle A, at equal distances, I attach wheels, E E E E, with bevelled rims, which mark the rows. The wheels are held in place on the axle by means of collars $a\ a\ a$, &c., and set-screws $g\ g\ g$, &c., so that the wheels may be moved upon the axle to vary the width of the rows, as may be desired. I make the wheels E E E E of sufficient diameter, that by placing the bevelled lugs H H H, &c., upon the periphery of the wheels, at opposite points, and as the wheels revolve, marking the rows one way, the lugs H H, &c., mark the rows the other way of the field. The joints B B are to allow the machine to work upon uneven ground.

What I claim as my invention, and desire to secure by Letters Patent, is—

The combination and arrangement of the axle A, provided with joints B B, the frame C, the seat D, the wheels E E E E, the collars $a\ a\ a$, &c., the set-screws $g\ g\ g$, &c., and the bevelled lugs H H H, &c., all arranged substantially as described for the purpose designed.

DAVID A. FREEMAN.

Witnesses:
JAMES T. CAMPBELL,
JOHN H. CAMPBELL.